United States Patent [19]

Huang

[11] Patent Number: 5,281,990

[45] Date of Patent: Jan. 25, 1994

[54] BATTERY PACK ADAPTER FOR VIDEO CAMERAS

[75] Inventor: Chin J. Huang, Taipei, Taiwan

[73] Assignee: Londo Photo Products Co., Ltd., Taipei, Taiwan

[21] Appl. No.: 933,091

[22] Filed: Aug. 21, 1992

[51] Int. Cl.⁵ .................................. G03B 07/26
[52] U.S. Cl. .................... 354/484; 354/295; 358/906; 358/909
[58] Field of Search ............... 354/126, 132, 295, 484, 354/75, 76, 81; 358/906, 909

[56] References Cited

U.S. PATENT DOCUMENTS 4,924,246  5/1990  Yamada ........................ 354/126
5,068,683 11/1991  Miyazaki ....................... 354/484

Primary Examiner—David M. Gray
Attorney, Agent, or Firm—Jacobson, Price, Holman & Stern

[57] ABSTRACT

A battery pack adaptor can be attached to any one of a number of brands of video cameras and can have any one of a number of brands of battery packs attached to it, so that any one of the cameras can be operated by any one of the battery packs interchangeably. The adaptor also has an arm for an electric lamp to be powered by the battery pack. The arm can be swung between left and right hand positions depending on the location of the lens system of the camera on which the adaptor is to be used.

7 Claims, 10 Drawing Sheets

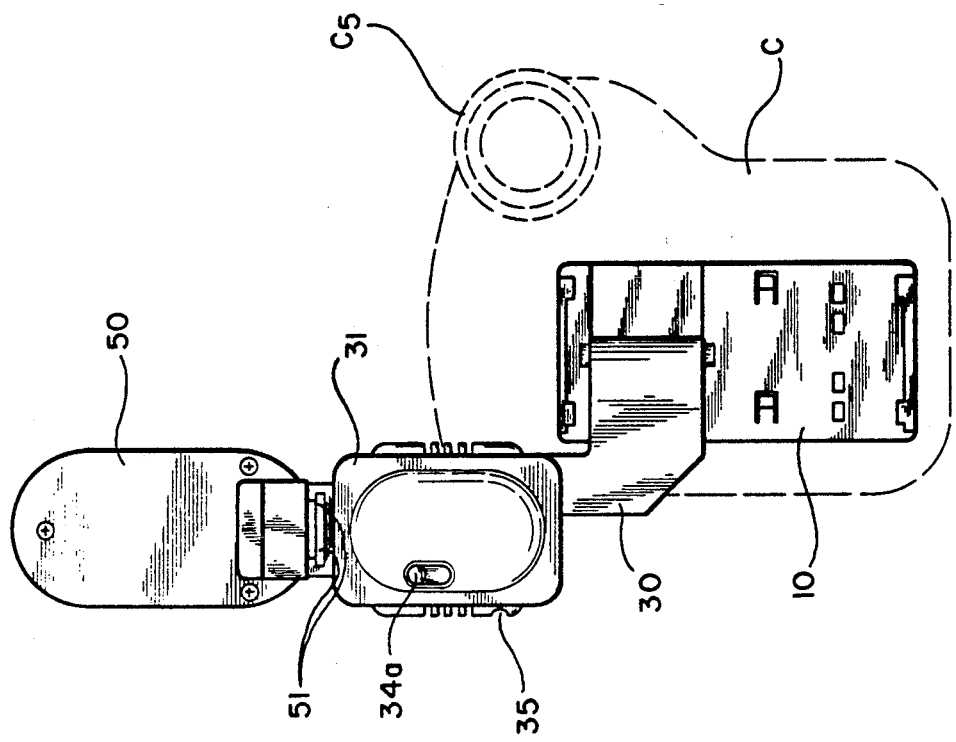
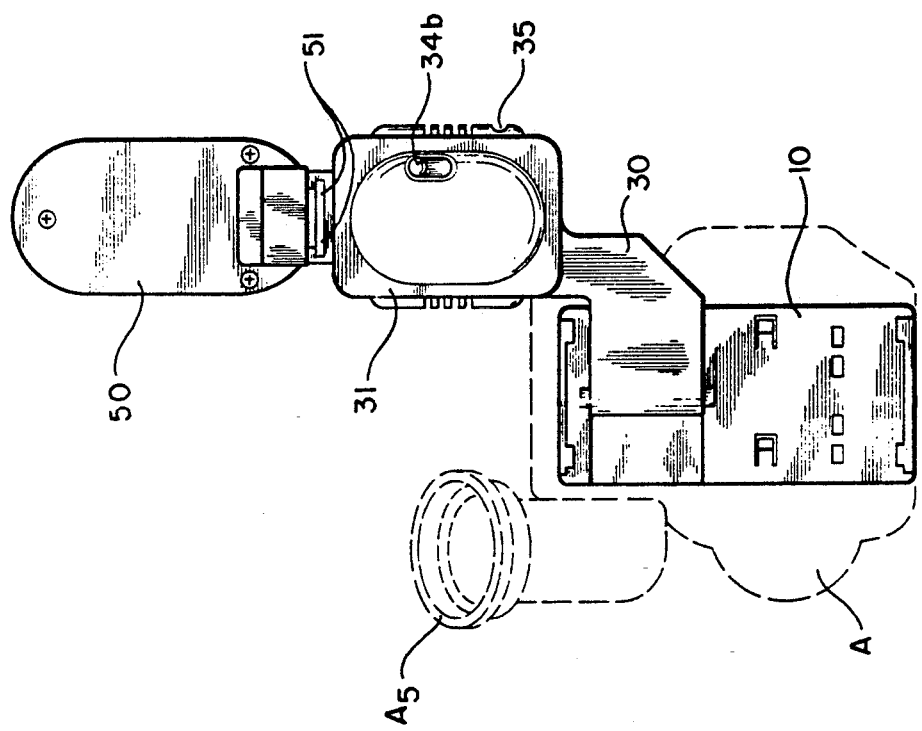

BATTERY PACK ADAPTER FOR VIDEO CAMERAS

BACKGROUND OF THE INVENTION

This invention relates to an adapter which enables a battery pack designed for use with a particular brand of video camera to be used on other brands of video cameras.

Video cameras generally are powdered by an attachable/detachable rechargeable battery pack. Among the common brands of video cameras, however, the design and mounting arrangements of the respective battery packs are somewhat different in their configuration and layout. Accordingly, it is not generally possible to use a battery pack which is specifically designed for use with one such brand of video camera on any of the other brands.

For example, among the more common brands of video cameras, the SONY, Panasonic, JVC, RICOH, Hitachi and Canon brands all have different design battery packs and mounting fixtures for attaching same to the respective cameras.

FIG. 1 shows a SONY brand video camera and battery pack combination. The video camera A has a rear seating surface for the battery pack B with two projecting electrically conducting pins A1 near the bottom of the mounting surface. Adjacent the pins A1 is a spring latch A2. At the top of the mounting surface is a projecting channel with end flanges A3 and a similar channel is provided along the bottom edge. The lens system A5 of the camera is located on the left-hand side along with a depressible button A4 for operating the latch A2.

On the front surface of the battery case B are electrically conducting terminal leaves or receivers B1 to receive the pins A1 and an adjacent notch B2 for the latch A2. Recesses B3 are provided along the top and bottom edges of the battery pack to receive the attachment flanges A3.

In use, the battery pack clips onto the back of the video camera with the various illustrated elements A1-A3 and B1-B3 in register so as to retain camera and battery case in connection. Release of the battery case is effected by depressing the button A4, thereby drawing the latch A2 from the notch B2 and allowing the battery case to slide out of engagement with the flanges A3.

FIG. 2 shows a Panasonic brand of video camera C and a corresponding battery pack D.

The rear mounting surface of the video camera, in this case, has projecting electrically conducting pins C1, a spring latch C2 controlled by a depressible button C4 and upper and lower flanges C3 for attachment of the battery pack.

The battery pack has recessed terminal leaves or receivers D1 to receive the pins C1, a notch D2 for the latch D2 and recesses D3 for receiving the flanges C3. The battery pack D attaches to the camera C in similar fashion to the attachment of the SONY pack to the corresponding camera but it is evident that the location and general disposition of the various pins latches and flanges are different for the respective cameras. Also, it will be seen that the lens system C5 of the Panasonic camera is on the right-hand of the camera in contrast to the lens system of the SONY camera.

FIG. 3 shows a Hitachi brand video camera E and corresponding battery pack F. Again, the camera has a back mounting surface for the battery pack with electrically conducting terminals E2 in one of the attachment flanges E1 at the top of the mounting surface and a spring latch E3 operated by a button E5. The battery pack has electrically conducting terminal F2 to connect with the terminals E2 and recesses F1 for the flanges E1. A notch F3 is provided to receive the latch E3. The Hitachi camera has its lens system E4 on the left-hand side.

The battery pack F attaches to the video camera E in like manner to those previously described, but again, the orientation and disposition of the various attachment elements and the like is different.

FIG. 4 shows a Canon brand video camera G and corresponding battery pack H. The mounting surface of the camera, in this case, has a peripheral surround G1 and electrically conducting terminals G2 on the base. A spring latch G4 is provided at the top of the mounting surface operated by a depressible button G6.

The battery pack has a notch H2 for the latch, electrically conducting terminal receivers H1 at the bottom and recesses H3 to fit projecting portions G3 of the camera surround. The lens system of the Canon camera is located at the top.

Again, the battery pack attaches and detaches in like manner to the previous arrangements but it is evident that the various components are differently positioned.

It is evident from the above that the individual battery packs each designed for a particular brand of camera because of the different disposition of the various cooperating elements, cannot be used on another brand of camera. Another problem which arises is that the various brands of battery packs are not necessarily usable with the same battery charger. Accordingly, when purchasing a battery charger, a user must ensure that he has a type suitable for the particular battery pack which it is intended to be used.

SUMMARY OF THE INVENTION

It is an object of the invention to provide an adapter device for use with video camera and battery packs in general and enable a battery pack specifically designed for use with one brand of video camera also to be used with other brands of video cameras.

Another object of the invention is to provide an adapter as a foresaid which further includes an arm for mounting a spot or flashlight and which can be moved selectively from side to side in accordance with the position of the lens system on a particular brand of video camera.

Still another object of the invention is to provide an adapter as a foresaid which has an attachment for a battery charger and corresponding circuity to enable any form of battery pack which is connected to the adapter to be charged from the same charger.

An adapter according to the invention has a front seating surface with variously positioned and disposed attachments enabling same to be connected selectively to a variety of video cameras and likewise having terminal receivers which are configured and disposed to receive the electrically conducting terminals of a variety of video cameras and connect same into a common electrical circuit contained within the adapter assembly. Also, the front seating surface of the adapter has variously disposed notch arrangements to receive the spring latches of different video cameras.

The adapter also has a back seating surface with various attachments enabling same to secure the different forms of battery pack for different video cameras and a plurality of conducting pin arrangements connecting into the aforesaid electrical circuit and positioned to contact the terminal receivers of the various battery packs.

At least in a preferred form of the invention, the rear seating surface has a horizontally extending recess in which there is pivotally mounted a swinging arm with a upright casing on the top of which can be mounted a flash or flood light. The swinging arm has included electrical circuitry for the light. The arrangement is such that the swinging arm can be positioned to the left or right of the battery pack selectively depending on the position of the lens system on the video camera to which the video camera is attached.

In use, the adapter can be connected to any one of a variety of video cameras and likewise can receive any one of a plurality of battery packs. The adapter may also include a connector and circuitry for a charger for a connected battery pack.

Other features and advantages of the invention will be apparent from the ensuing description and claims taken in conjunction with the attached drawings.

BRIEF DESCRIPTION OF DRAWINGS

FIGS. 8A-3E are front perspective view of the adapter shown together with a SONY brand video camera, a Panasonic brand video camera, a Hitachi brand video camera and a Canon brand video camera to indicate the manner of attachment of the adapter to the various cameras, FIG. 10A is a rear elevational view of the adapter connected to a SONY brand video camera, and FIG. 10B is a rear elevational view of the adapter attached to a Hitachi brand video camera.

DESCRIPTION OF PREFERRED EMBODIMENT

A battery pack adapter 10 according to the invention has a front seating surface by which the adapter can be attached to any one of the above-described video cameras and a rear seating surface to which can be attached any one of the battery packs previously described.

Figure 5:
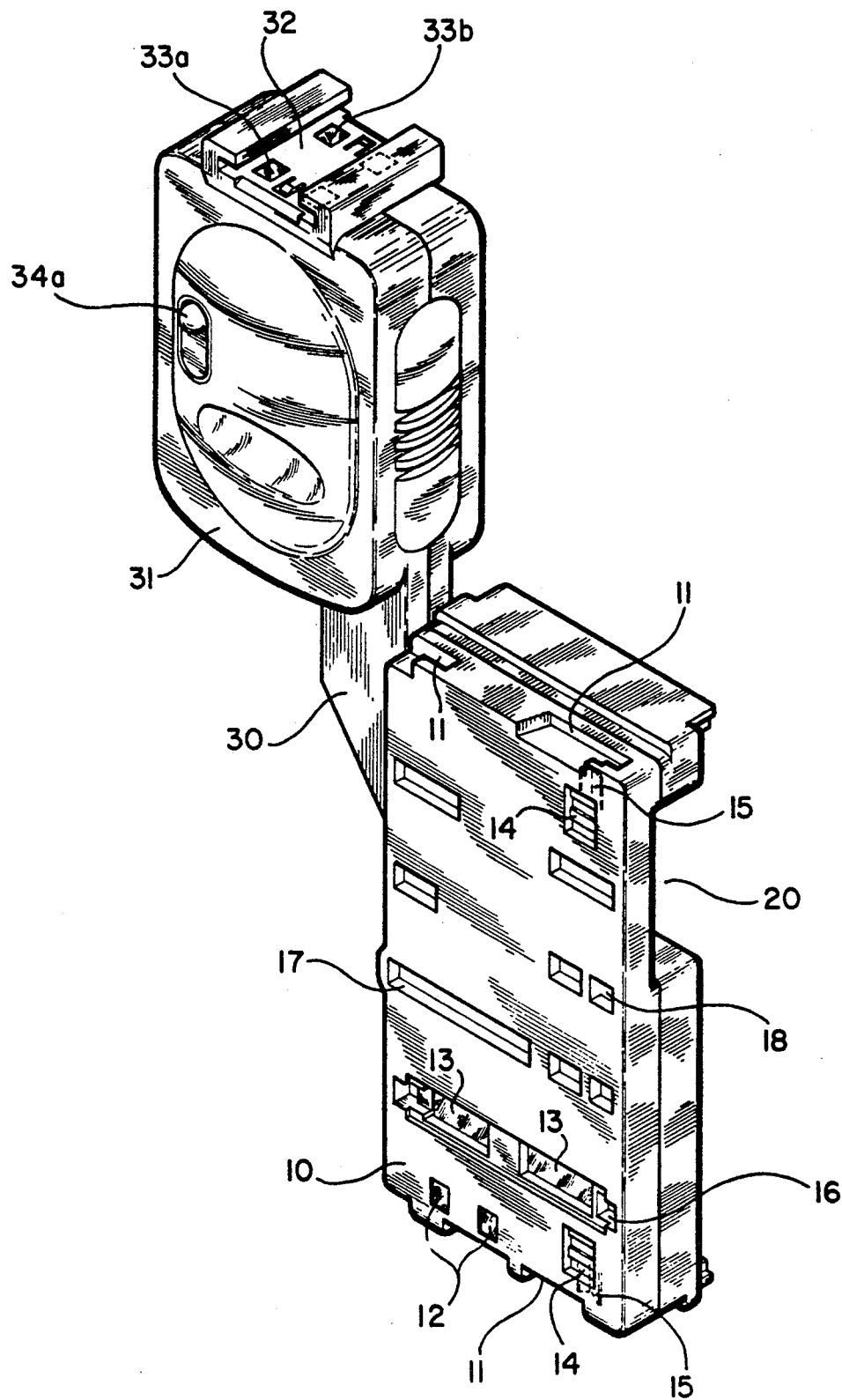
FIG. 5, is a front perspective view of a video camera and battery pack adapter according to the invention.

Referring initially to FIG. 5, the front seating surface of the adapter includes two electrically conducting receivers 12 at the lower edge for the terminals G2 of a Canon camera and corresponding generally to the terminal receivers H1 of the Canon battery pack. Above the receivers 12, are two horizontally extended electrically conducting receivers 13 which can accommodate either the pins A1 of the SONY camera or the pins C1 of a Panasonic camera. At the top and bottom of the receiving surface, are provided respective switches for raising and lowering terminal receivers 15 for the terminals E2 of a Hitachi camera and generally corresponding with the terminal receivers F2 of the Hitachi battery pack. The terminals 15 are controlled by the switches 14 for use with the Hitachi camera. Respective notches 16, 17 and 18 are provided for the latches A2, C2 and E3 of the SONY, Hitachi and Panasonic cameras. Top and bottom, the adapter has recess 11 to fit the respective flanges of the various cameras.

Figure 1:
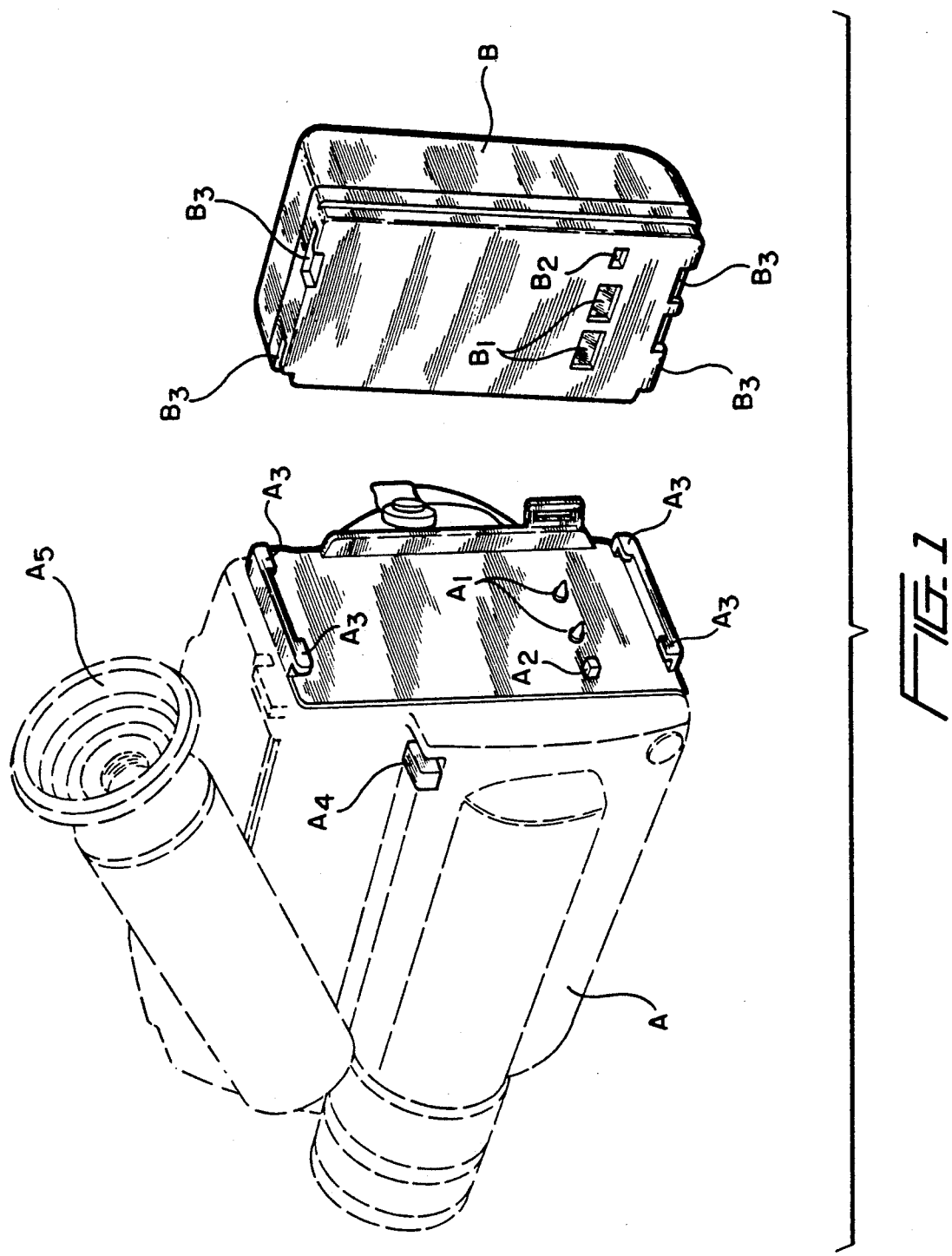
FIG. 1, is a somewhat diagrammatic perspective view of a SONY brand video camera and corresponding battery pack.
Figure 2:
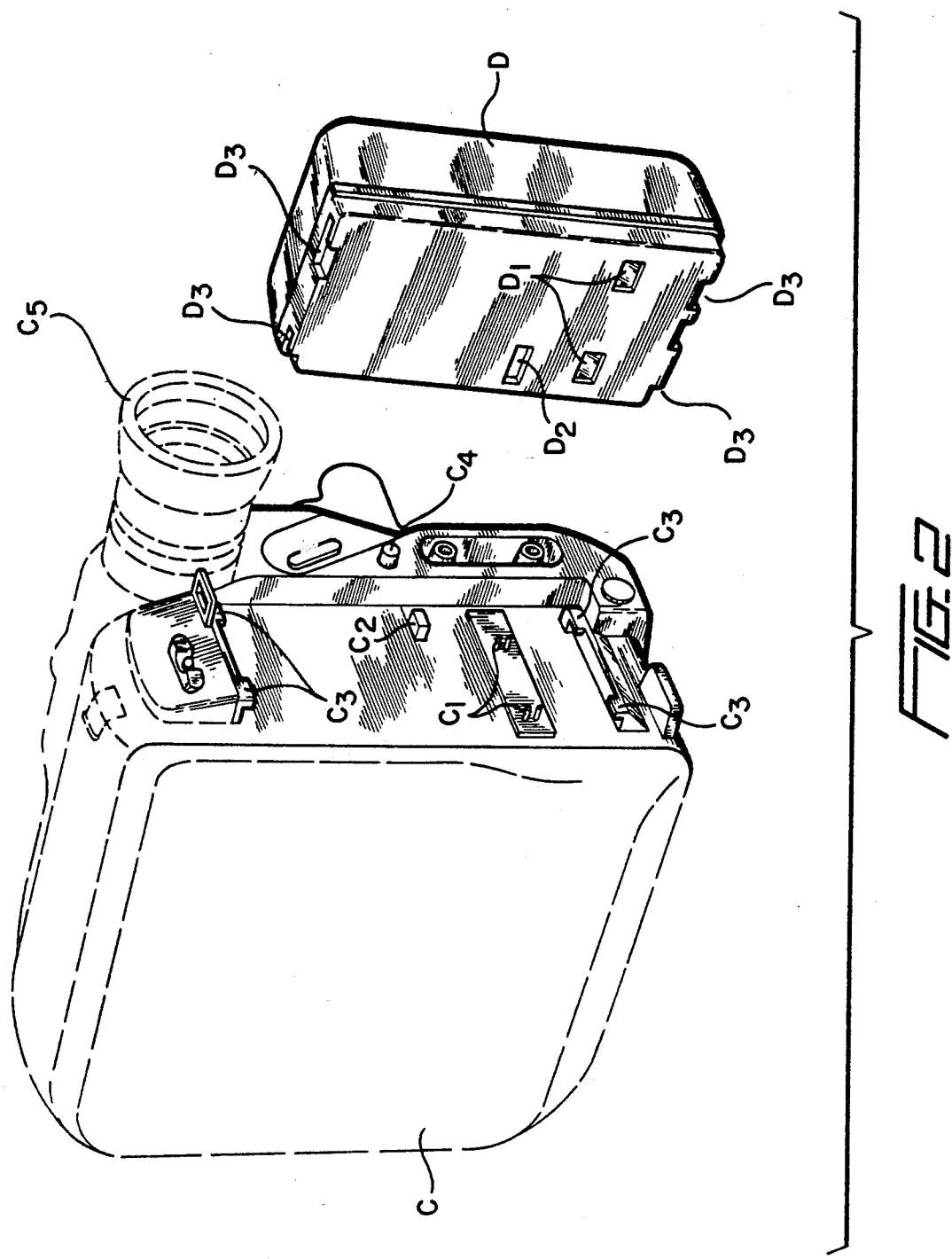
FIG. 2, is a somewhat diagrammatic perspective view of a Panasonic brand video camera and corresponding battery pack.
Figure 3:
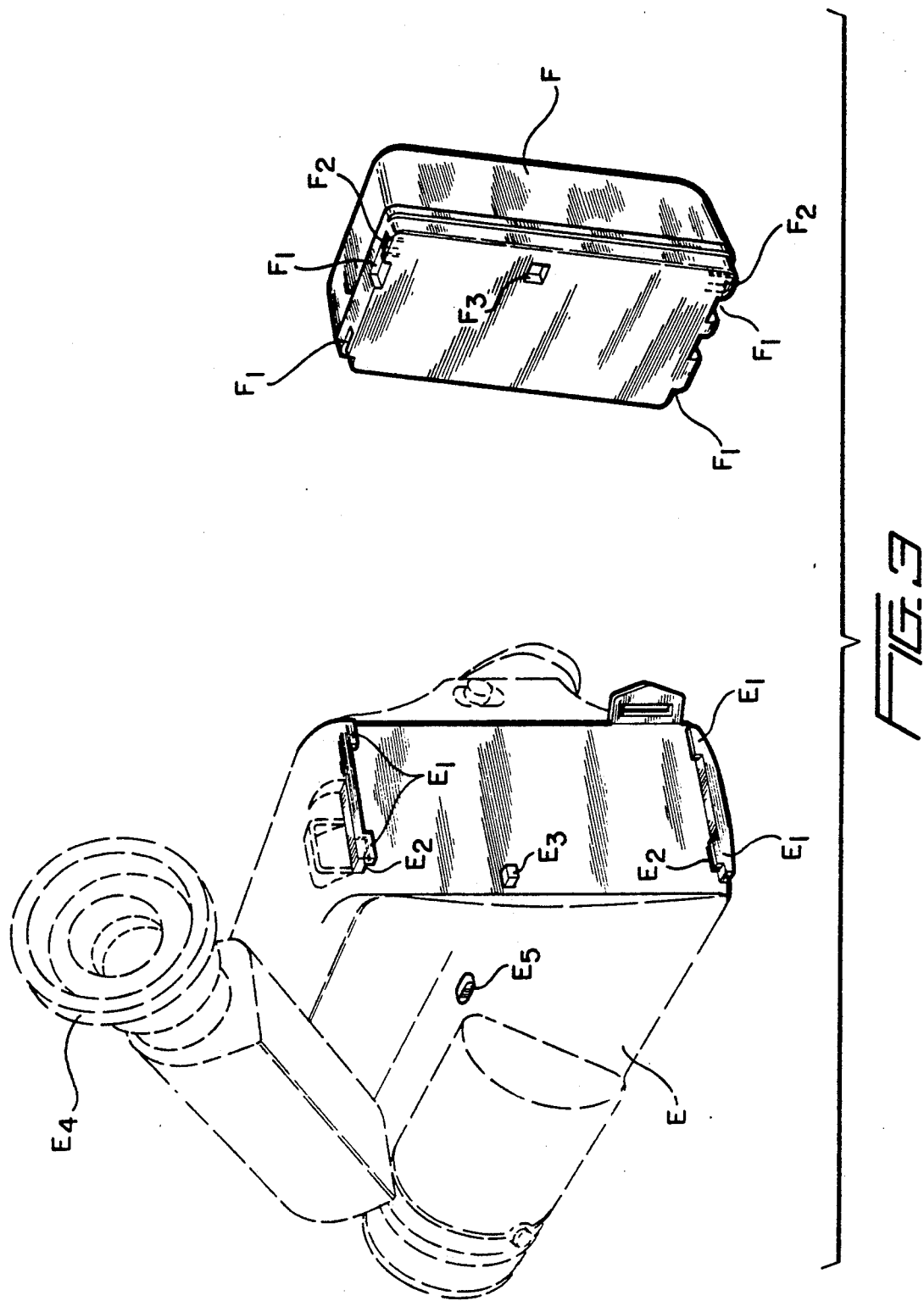
FIG. 3, is a respective view of a Hitachi video camera and corresponding battery pack.
Figure 4:
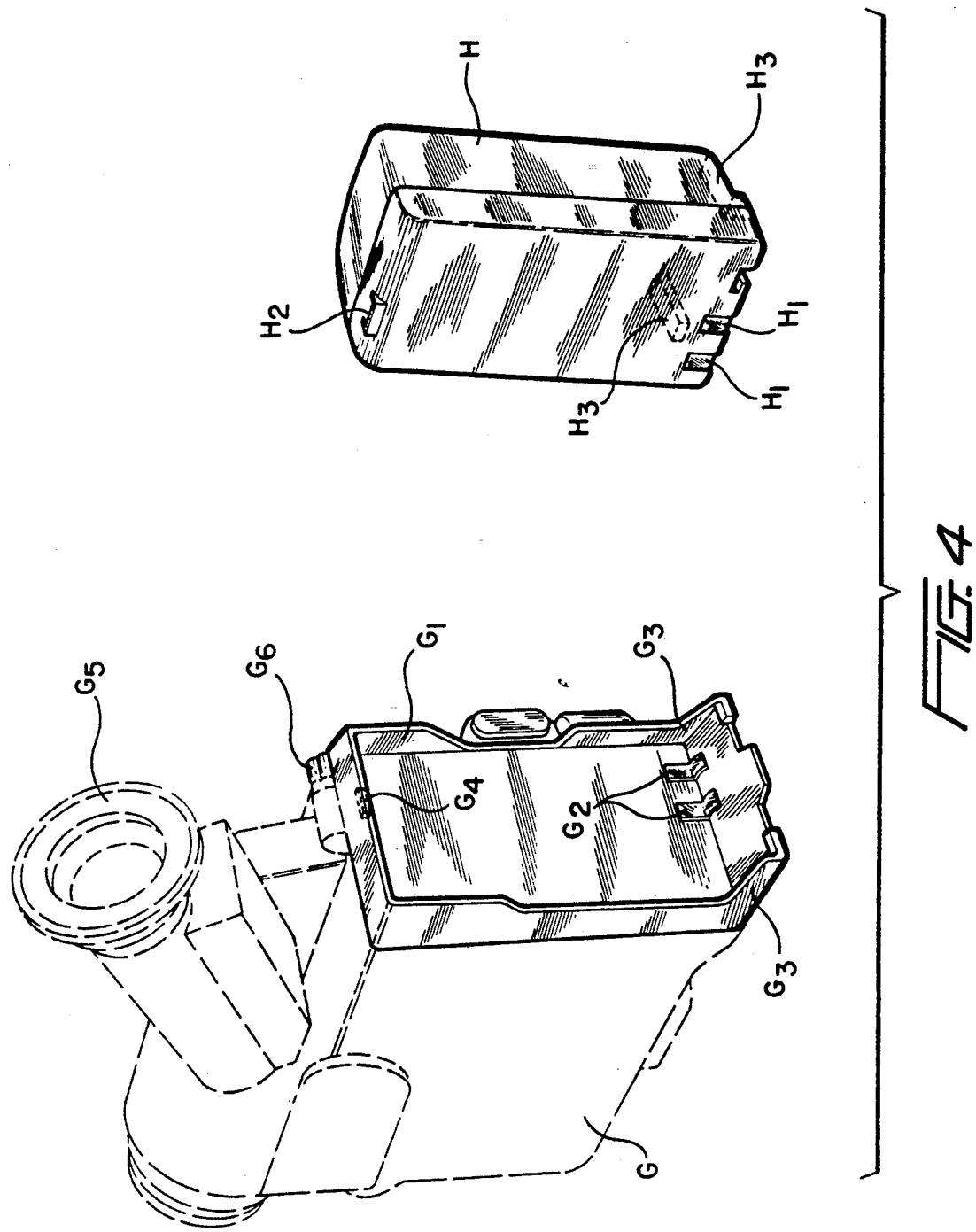
FIG. 4, is a somewhat diagrammatic perspective view of a Canon video camera and corresponding battery pack.
Figure 6:
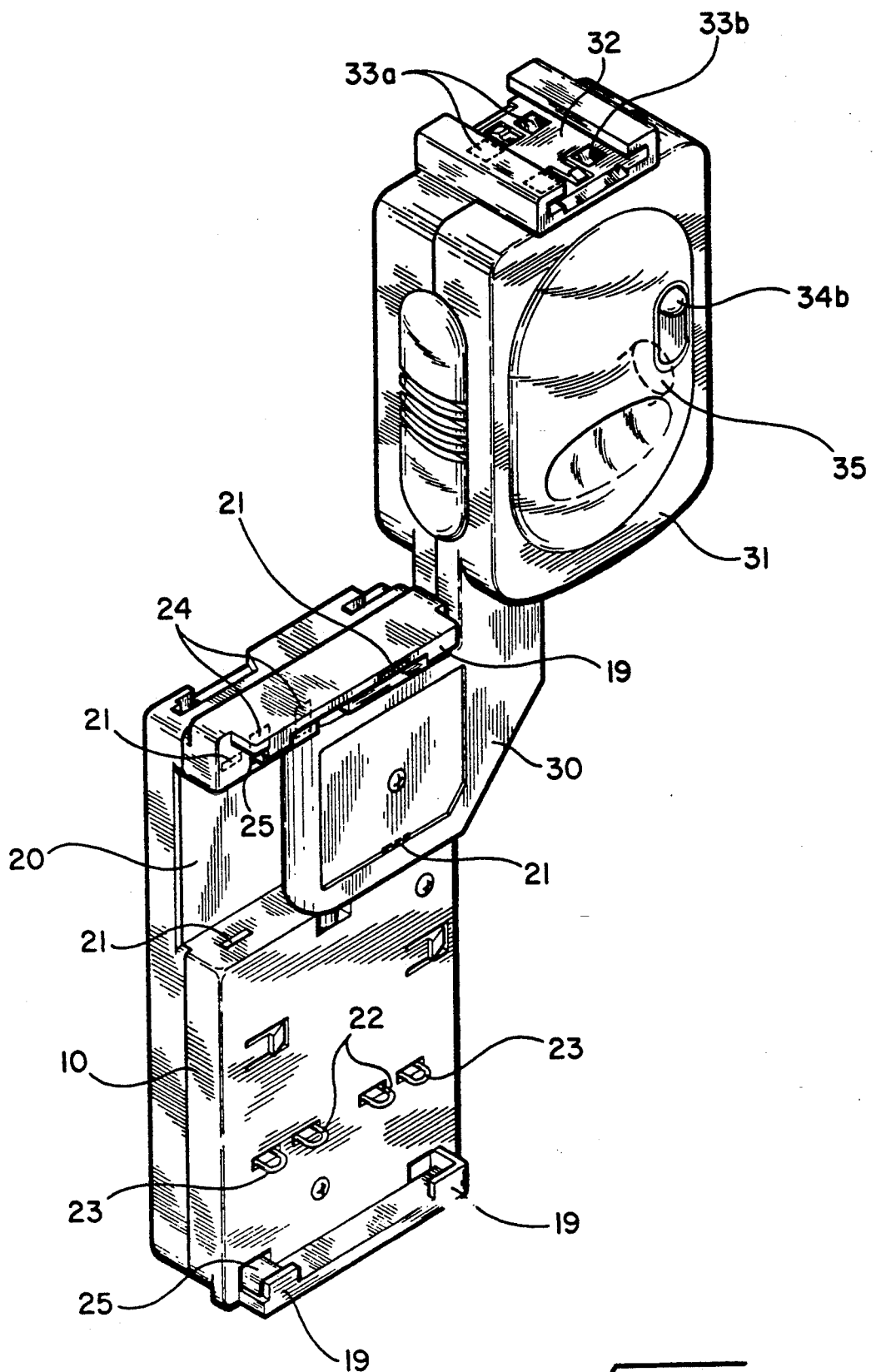
FIG. 6, is a rear perspective view of the adapter.

Referring to FIG. 6, the rear seating surface of the battery pack has channels at the top and bottom with flanges 19 corresponding to the flanges at the back of each of the respective video cameras. A horizontally extending recess is provided in the rear seating surface and a horizontal swing arm 30 is pivotally mounted in the center of the recess. The swing arm 30 has a vertical leg carrying a casing 31 at the top of which is a seat 32 for a flash or flood light. The seat 32 includes two sets of symmetrical electrically conducting terminal 33a, 33b. Symmetrical control switches 34a, 34b (FIGS. 4 and 5) are provided on the opposite faces of the casing 31. Either switch 34a or 34b can be used to control the light, depending on the orientation of the arm 30 either to the left or to the right of the adapter 10 depending on the type of camera with which is being used.

The casing 31 includes an electric circuit for the light which does not form part of the present invention but which is incorporated in applicant's co-pending application relating thereto and incorporated herein by reference. An electrically conducting socket 35 is provided in one side wall of the casing 31. The top and bottom edges of the radial arm 30 are provided with recess to receive projections 21 in the recess 20 and positively locate the arm 30 either in the left or right hand position.

Below the arm 30, the rear seating surface of the adapter is provided with two sets of electrically conducting terminals 22, 23. The terminals 22 correspond with the electrically conducting pins A1 of a SONY video camera and are to be used with the terminal receivers B1 of a SONY battery case. Similarly, the terminals 23 correspond with the terminals C1 of a Panasonic camera and are to be used to the terminal receivers D1 of the Panasonic battery case. At the top edge of the adapter are terminals 24 to be used with a Canon battery case and there are top and bottom terminals 25 to be used with a Hitachi battery case.

Figure 7:
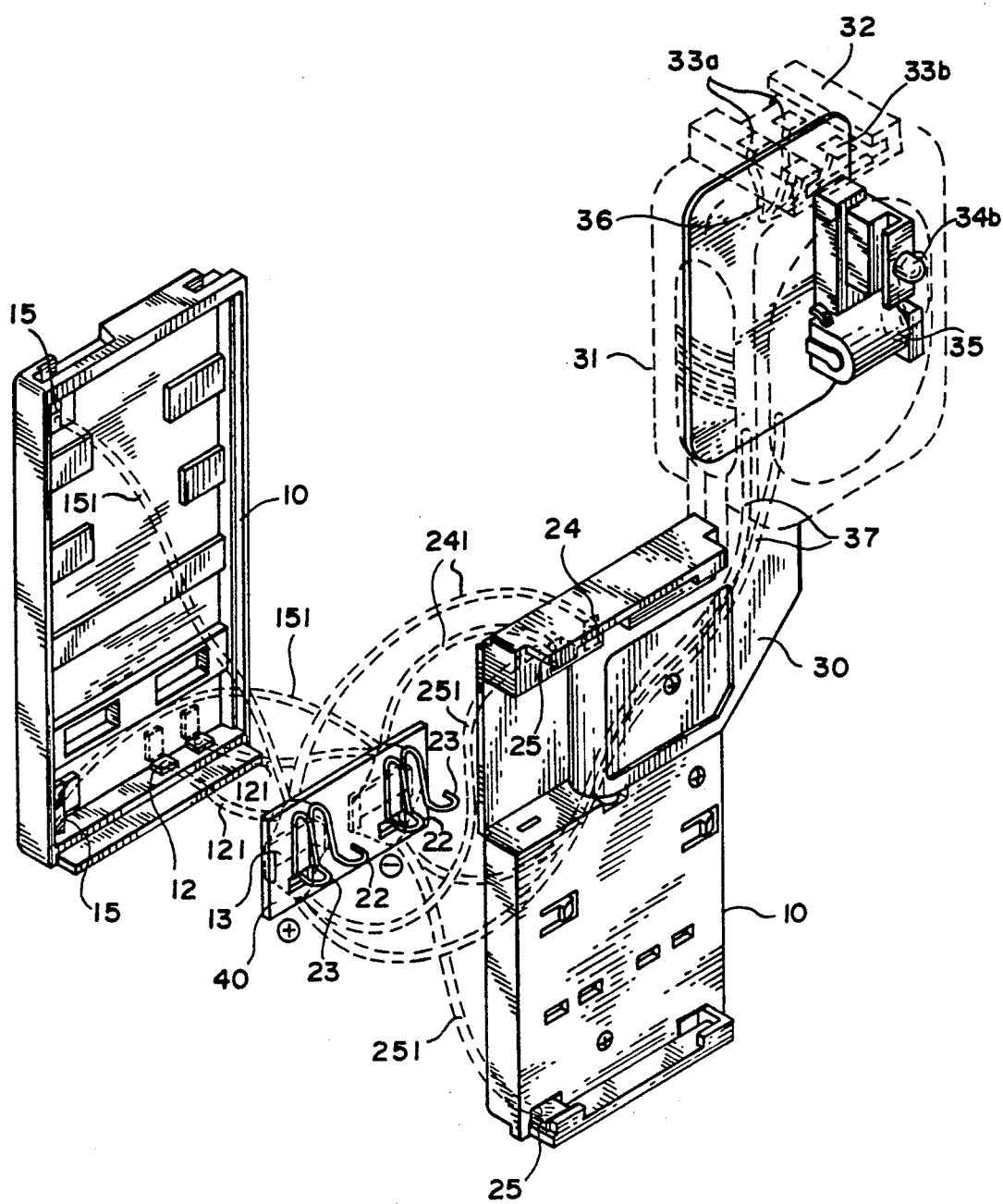
FIG. 7, is an exploded rear perspective view of the adapter partly broken away.
Figure 8A:
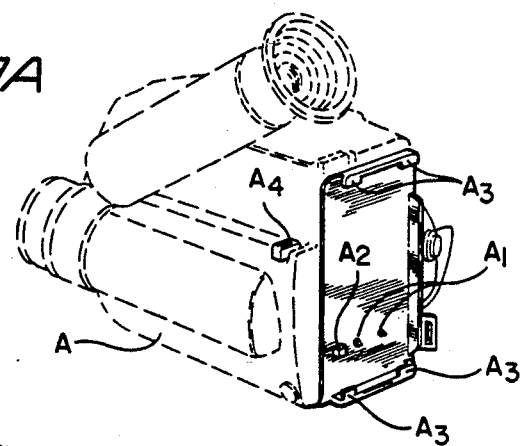
Figure 8B:
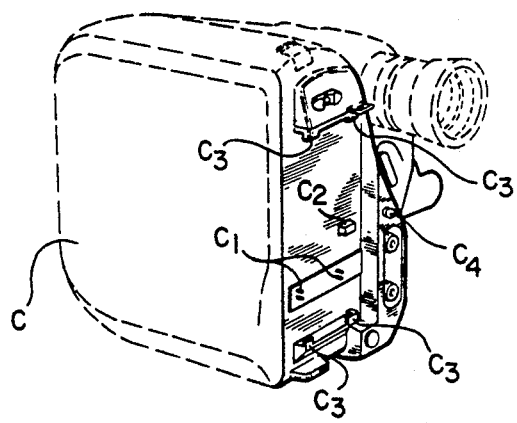
Figure 8C:
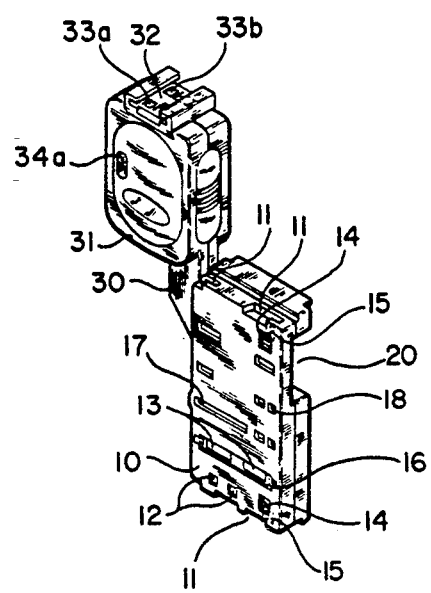
Figure 8D:
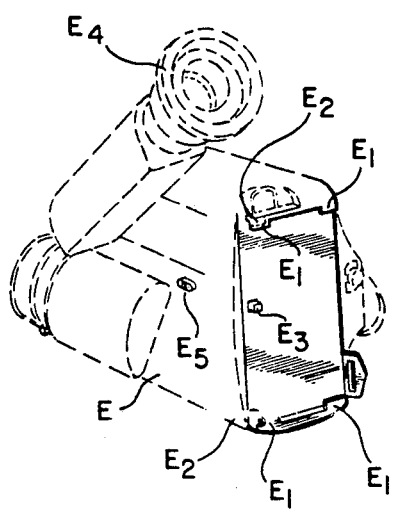
Figure 8E:
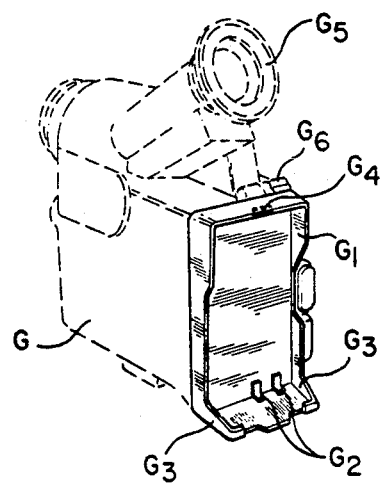
Figure 9A:
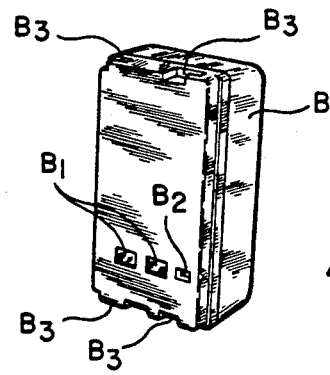
FIGS. 9A-9E are rear perspective views of the adapter along with respective battery packs for the SONY brand camera, the Panasonic brand camera, the Hitachi brand camera and the Canon brand camera showing the manner of attachment of the respective battery packs to the adapter.
Figure 9B:
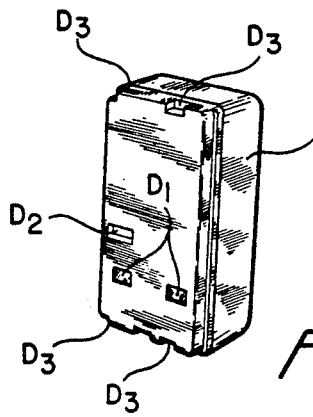
Figure 9E:
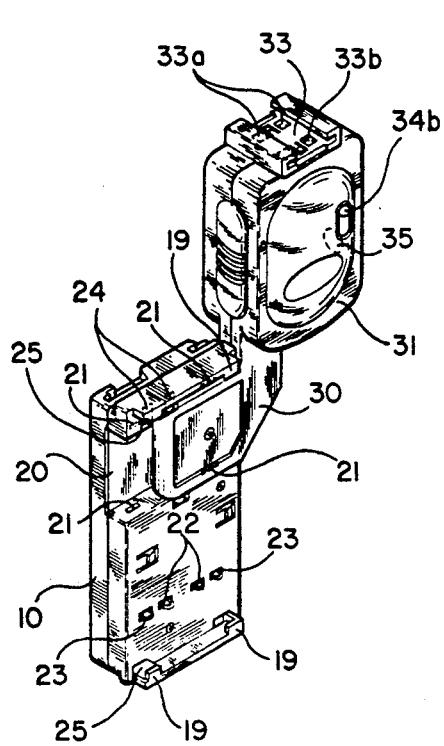
Figure 9C:
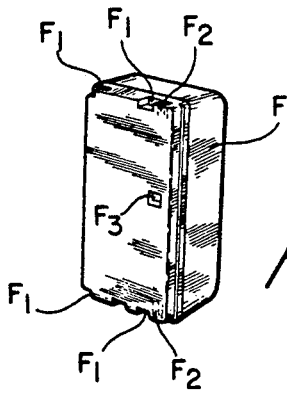
Figure 9D:
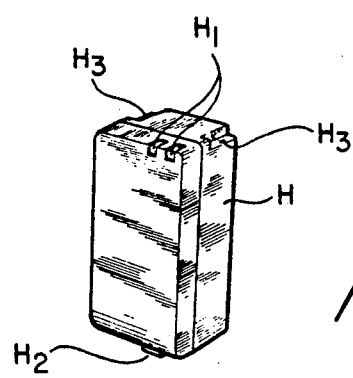

FIG. 7 shows the electrical connections between the terminal receivers 12, 13 and 15 on the front seating face of the adapter and the terminals 22, 23, 24 and 25 on the back seating face.

Internally, the adapter includes a PC board locked in place and having a "+" polar zone and a "−" polar zone. The terminal receivers 12, 13 and 15 are connected by wiring to the respective zones of the PC board on its front face and the terminals 22, 23 are welded to the respective zones on the back of the PC board. The respective connecting wires are shown at 121, 151, 241, 251. Additionally, the casing 31 of the swing arm 30 also includes a PC board for operation of the lamp. In this case, the respective terminals 33a, 33b are connected to the circuit board by wiring 36 and it is understood that the polarity of this circuit is also divided into suitable positive and negative zones. After passing through the control switches 33a, 33b for the lamp circuit board, the lamp circuit is connected to the positive and negative polar zones of the PC board 40 by wires 37, which conveniently extend through the pivot connection of arm 30. This wiring enables the lamp seat to be supplied with electrical energy from an attached battery case in either left or right-hand position of arm 30. Additionally, the electrically conducting socket 35 on the side of casing 31 can be connected to the control circuit board and into the board 40 by suitable wiring similar to wires 37. It is evident that the electrical circuity for the interior of the invention includes the various elements connected in series.

The above described adapted structure provides compatibility between the different brands of cameras and battery cases previously described and also provides for battery charging and installation of a sunlamp either on the left or right-hand side of the adapter.

FIGS. 8A–8E show how the adapter 10 can be fitted to the back seating surface of any one of the above noted video cameras. Thus, for attaching the adapter to a SONY brand camera A, the flanges A3 at the top and bottom edge of the camera are inserted into the slideways 11 at the top and bottom edge of the adapter. The two terminal receivers 13 are positioned so as to contact the two electrically conducting pins A1 and the latch A2 is located in the notch 16. Any one of the battery packs previously described can then be inserted on the rear seating face of the adapter as will be described.

For the Panasonic brand camera C, the flanges C3 on the camera are inserted again in the slides 11 at the top and bottom edge of the adapter 10. The two electrically conducting terminal receivers 13 in this case will contact with the pins C1 on the camera and the latch C2 is received in the notch 17 of the adapter. Again, any one of the battery cases can be used.

For the Hitachi brand camera E, the flanges E1 are again receivable in the slide 11 and the terminal receivers 15 are brought into position by means of the respective switches 14 so as to contact the terminals E2 at the top and bottom of the camera. The latch E3 is received in notch 18 of the adapter.

For the Canon brand camera G, the casing 10 of the adapter is inserted directly into the surrounding flange G1 at the back of the camera. The two terminal receivers 12 at the bottom edge of the adapter will contact with the two electrically conducting terminals G2 at the bottom of the camera and the latch G4 will be received in the slideway 11.

The compatibility between the adapter 10 and any one of the respective battery cases is shown in FIGS. 9A–9E.

For the SONY brand battery case B, the projecting flanges 19 at the back of the adapter are inserted into the recesses D3 at the top and bottom edges of the battery case and the battery case is slid into place. The electrically conducting terminals 23 are positioned so as to contact the receivers B1.

Likewise, for the Panasonic brand battery case D, the flanges 19 are inserted in the respective recesses D3 and the battery cases again are slid into position. In this case, the two electrically conducting terminals 23 are in electrical contact with the two receivers D1.

For the Hitachi brand battery case F, the flanges 19 are again inserted in the slideways D3 at the top and bottom edges of the battery case. The terminals 25 at the top and bottom of the adapter will in this case contact the terminals F2 on the battery case.

Finally, for the Canon battery case H, this is inverted so that the terminals H1 face upwards and the case is used in this position on the back of the adapter. In this case, the terminals 24 are used in connection with the receivers H1. By the above, it is evident that the battery cases can be used interchangeably with any one of the video cameras using the inventive adapter.

The inventive adapter can also be used as a charger for any one of the battery cases either when the battery case is attached to or disconnected from one of the respective cameras. When charging, the camera is in the off status and a rectifier can be used to connect mains AC electricity to the electrically conducting socket 35 in the casing 31. When the electrical supply is reduced and rectified, it is transmitted to an attached battery case at the back of the adapter through the electrically conducting pole 35, the wires 37 and the PC board 40 for charging the battery case through the respective terminals in the adapter and the terminal receivers on the battery case.

FIGS. 10A and 10B show how the swing arm with an attached lamp 50 can be used either in the right hand or left hand orientation on the back of the adapter 10 with, for example, a SONY brand video camera as shown in FIG. 10A or with a Panasonic brand camera as shown, for example, in FIG. 10B. This is done by swinging the arm so that the strips 21 at the top and bottom edges of the channel 20 engage the respective recesses (not shown) in the arm 30. Then, the lamp is inserted in the lamp seat 33 at the top of casing 31. Upon insertion, a terminal 51 at the front edge of the bottom of the lamp 50 is brought into electrical contact with the front set of electrodes 33a on the sunlamp seat. This causes the lamp 50 to be supplied with electricity from a battery case when attached to the back of the adapter. The lamp should only be attached after the radial arm has been swung either to the left or right hand position. Depending on the left or right hand positioning of the arm, either set of terminals 33a or 33b will be in use for the sunlamp and these are controlled by either one of the switches 34a and 34b.

It may here be noted that the switches 34a and 34b provide three different control modes for the lamp. In the first mode, synchronous operation, the on and off operation of the lamp is synchronous with the photography of the camera. For example, when the switch for operating the camera is on, the lamp 50 lights synchronously to supplement illumination. When camera operation is terminated, the lamp 50 is also switched off.

In the second mode of operation, the lamp is permanently off, there being no power supplied from the battery case.

In the third mode of operation, power is continuously supplied from the battery case to the lamp irrespective of the operation of the attached camera.

While only preferred embodiments of the invention have been described herein in detail, the invention is not limited thereby and modifications can be made within the scope of the attached claims.

I claim:

1. An adapter for attachment to any one of a plurality of different brand video cameras to enable the video camera to be used with any one of a plurality of different brand battery packs, wherein each brand of video camera and battery pack has a distinctly different seating surface configuration than other brands of cameras and battery packs, and wherein the brand of the battery pack need not be the same as the brand of the camera, the adaptor comprising an adaptor casing having a front seating surface and a rear seating surface, the front seating surface having attachment means enabling the casing to be attached to any one of said distinctly different seating surfaces of said cameras, and terminal receiver means for electrical connection to electrical conductors on any one of said distinctly different seating surfaces of said cameras, the rear seating surface of the casing having further attachment means for enabling any one of said battery packs to be secured thereto and electrical terminal means for connection to terminal receivers on any one of said distinctly different seating surfaces of said battery packs, electric circuit means within the casing for electrically connecting the terminal receiver means on the front seating surface of the casing to the terminal means on the rear seating surface of the casing, said adaptor further including an arm projecting from said casing, a seat on said arm for an electric lamp and electrical circuitry including wiring extending through said arm and into said casing for electrically connecting said seat to said electric circuit means whereby a lamp attached to the seat can be operated by a battery pack attached to the adaptor.

2. An adaptor as claimed in claim 1, wherein the arm includes an electrical socket for connection of a battery charger.

3. An adaptor as claimed in claim 1 which includes a pivotal mounting arrangement between the arm and the casing providing swinging movement of the arm on the casing between left and right hand operative positions to accommodate differently positioned lens systems on the respective cameras.

4. An adaptor as claimed in claim 3, wherein the arm includes a horizontal portion and a vertical portion with a housing for said circuit means and said seat atop the housing, and wherein said mounting arrangement includes a horizontal recess extending across the casing, said horizontal portion of said arm received in said recess and pivot connections between said horizontal portion of said arm and opposite walls of said recess whereby swinging movements of the arm about said pivot connections are effective to locate the vertical portion of the arm and said housing on opposite sides of the casing respectively.

5. An adaptor as claimed in claim 4, including detent means on respective walls of said recess and said horizontal portion of the arm for positively locating the arm in the left and right hand positions.

6. An adaptor as claimed in claim 3, wherein the seat includes first and second electrical contacts for respective use with a lamp when the arm is in the left and right hand positions, the contacts being connected in parallel in said circuit means and first and second lamp switches on opposite sides of the arm respectively and connected in parallel in said circuit means for operating the lamp in the left and right hand positions respectively.

7. An adaptor as claimed in claim 6, wherein each of said switches has an off position, a lamp synchronous-mode operating position and a lamp continuous-mode operating position.

* * * * *